US012486715B2

(12) United States Patent
Liang

(10) Patent No.: US 12,486,715 B2
(45) Date of Patent: Dec. 2, 2025

(54) SCROLLING MECHANISM FOR WINDOW SHADES

(71) Applicant: CHING FENG HOME FASHIONS CO., LTD., Changhua County (TW)

(72) Inventor: Wen Ying Liang, Changhua County (TW)

(73) Assignee: CHING FENG HOME FASHIONS CO., LTD., Changhua County (TW)

( * ) Notice: Subject to any disclaimer, the term of this patent is extended or adjusted under 35 U.S.C. 154(b) by 169 days.

(21) Appl. No.: 17/898,362

(22) Filed: Aug. 29, 2022

(65) Prior Publication Data

US 2024/0026735 A1 Jan. 25, 2024

(30) Foreign Application Priority Data

Jul. 20, 2022 (TW) .................................. 111127235

(51) Int. Cl.
*E06B 9/60* (2006.01)
*E06B 9/42* (2006.01)
*E06B 9/44* (2006.01)

(52) U.S. Cl.
CPC .................. *E06B 9/42* (2013.01); *E06B 9/44* (2013.01); *E06B 9/60* (2013.01)

(58) Field of Classification Search
CPC ..... E06B 9/08; E06B 9/11; E06B 9/17; E06B 9/171; E06B 9/40; E06B 9/42; E06B 9/44; E06B 9/56; E06B 9/60; E06B 9/68; E06B 9/322; E06B 2009/2622; E06B 2009/3222
See application file for complete search history.

(56) References Cited

U.S. PATENT DOCUMENTS 7,866,367 B2 * 1/2011 Liang ...................... E06B 9/323 74/397
8,820,385 B2 * 9/2014 Wu ......................... E06B 9/322 160/170
9,353,570 B2 * 5/2016 Smith ....................... E06B 9/40
10,113,359 B1 * 10/2018 Chen ......................... E06B 9/42
10,533,371 B2 * 1/2020 Chen .................... B65H 75/486
10,612,299 B2 * 4/2020 Chen .................. B65H 75/4492
10,787,859 B2 * 9/2020 Huang .................... E06B 9/262
10,865,600 B2 * 12/2020 Zhang ..................... E06B 9/307
10,883,307 B2 * 1/2021 Huang .................... E06B 9/262
10,895,106 B2 * 1/2021 Goldberg .................. E06B 9/44
11,326,397 B2 * 5/2022 Lei ........................... E06B 9/42
11,697,964 B2 * 7/2023 Lei ........................... E06B 9/42 160/315

(Continued)

FOREIGN PATENT DOCUMENTS

KR 102117825 B1 * 6/2020
TW 202405296 A * 2/2024

*Primary Examiner* — Johnnie A. Shablack
(74) *Attorney, Agent, or Firm* — Che-Yang Chen; Law Office of Michael Chen

(57) ABSTRACT

A scrolling mechanism for a window shade is received in a tube and includes a housing, a wheel, a driving gear, a bevel gear unit, a first scrolling unit and a second scrolling unit. Two springs are respectively connected to the first scrolling unit and the second scrolling unit. The driving gear drives the first scrolling unit, the first scrolling unit drives the second scrolling unit. The torque generated by the scrolling mechanism balances the torque that is created by operation to the bottom rail of the shade so as to control the position of the shade.

6 Claims, 9 Drawing Sheets

(56) References Cited

U.S. PATENT DOCUMENTS

| | | | | |
|---|---|---|---|---|
| 2011/0247762 | A1* | 10/2011 | Lin | E06B 9/40 160/84.02 |
| 2017/0016274 | A1* | 1/2017 | Zheng | E06B 9/26 |
| 2017/0204656 | A1* | 7/2017 | Chen | E06B 9/322 |
| 2017/0292322 | A1* | 10/2017 | Chen | B65H 75/4492 |
| 2018/0230744 | A1* | 8/2018 | Huang | E06B 9/38 |
| 2018/0313143 | A1* | 11/2018 | Chang | E06B 9/322 |
| 2024/0026735 | A1* | 1/2024 | Liang | E06B 9/44 |

* cited by examiner

SCROLLING MECHANISM FOR WINDOW SHADES

BACKGROUND OF THE INVENTION

1. Fields of the Invention

The present invention relates to a scrolling mechanism for a window shade, and more particularly, to a scrolling mechanism for a window shade that has simple structure and high performance efficiency.

2. Descriptions of Related Art

As shown in FIG. 1, the conventional window shade includes a shade 5 including multiple sections wherein some sections include holes allowing light passing therethrough, and some sections are opaque. The shade 5 as shown in FIG. 1 includes two layers overlapped to each other, wherein the rear end of the shade 5 includes an insertion 51 which is inserted into a slit 11 of the top rail 1 to connect the shade 5 to the top rail 1. Two covers 2 are connected to two ends of the top rail 1. The front end of the shade 5 goes around the bottom rail 6 and is wrapped around a tube 3 that is located between the two covers 2. A scrolling mechanism 4 located in the tube 3 and scrolls the shade 5 up and down, and to symmetrically align the sections with holes with the sections that are opaque to adjust brightness in the room.

The scrolling mechanism 4 uses a scrolling member or springs, wherein the scrolling member has to be controlled by ropes which have potential risks to children. The scrolling mechanism 4 that uses springs includes a weight connected to the bottom rail. The springs have to be twisted before being put into the tube 3 so as to apply a torque to the shade 5, when the users pull the bottom rail 6, the torque of the springs controls the positions of the shade 5. However, as shown in FIG. 2, the springs are pre-twisted and cannot be evenly installed to the tube 3. In addition, the torque has to be adjusted according to the length of the shade 5. When adjusting the springs, the springs may be moved and shifted, and this increase work hours for the adjustment.

The present invention intends to provide a scrolling mechanism for a window shade to eliminate the shortcomings mentioned above.

SUMMARY OF THE INVENTION

The present invention relates to a scrolling mechanism for a window shade, and the window shade includes a top rail, and two covers are connected to two ends of the top rail. A tube is located between the two covers and includes multiple ridges extending axially from the inner periphery thereof. The top rail includes a slit, and a shade has an insertion formed to the top end thereof, the insertion is inserted into the slit of the top rail. A bottom rail is connected to the lower end of the shade. The shade is lifted and lowered along with rotation of the tube.

The scrolling mechanism comprises a housing, a wheel, a driving gear, a bevel gear unit, a first scrolling unit and a second scrolling unit. The housing includes a bottom part and a top part which is connected to the bottom part. The scrolling mechanism is located in the tube. The housing of the scrolling mechanism accommodates the driving gear, the bevel gear unit, the first scrolling unit and the second scrolling unit therein. The wheel is connected to the first end of the housing and located in the tube. The wheel includes grooves defined axially in the outer periphery thereof and the ridges of the tube are engaged with the grooves, so that the wheel is co-rotated with the tube. The wheel includes a central hole, and the shaft of the driving gear is engaged with the central hole.

The bevel gear unit includes a bevel gear and a planar gear which is co-axially formed with the bevel gear. The diameter of the planar gear is larger than the diameter of the bevel gear so that the bevel gear is located at the center of the planar gear and surrounded by the planar gear. The bevel gear is engaged with the driving gear which drives the bevel gear and the planar gear.

The first scrolling unit is engaged with the bevel gear unit. The first scrolling unit includes a first active roller and a first passive roller. Two first active gears are respectively connected to two ends of the first active roller. The first active roller includes a first active shank formed to a middle portion thereof. One of the first active gears is engaged with the planar gear so that the first active roller is driven by the planar gear. Two first passive gears are respectively connected to two ends of the first passive roller. The first passive roller includes a first passive shank formed to a middle portion thereof.

A first spring has the first end thereof wrapped to the first passive shank. The second end of the first spring is wrapped to the first active shank of the first active roller. The two first passive gears are engaged with the first active gears, and one of the first active gears is engaged with the planar gear. When the first active gears rotate in a first direction, the two first passive gears rotates in a direction opposite to the first direction of the first active gears, and the first spring of the first passive shank scrolls toward the first active shank.

The second scrolling unit is engaged with the first passive roller of the first scrolling unit. The second scrolling unit includes a second active roller and a second passive roller. Two second active gears are respectively connected to two ends of the second active roller. The second active roller includes a second active shank formed to the middle portion thereof. The second active gears are engaged with the first passive gears so that the second active roller is driven by the first passive gears. Two second passive gears are respectively connected to two ends of the second passive roller. The second passive roller includes a second passive shank formed to the middle portion thereof.

A second spring has the first end thereof wrapped to the second passive shank. The second end of the second spring is wrapped to the second active shank of the second active roller. The two second passive gears are engaged with the two second active gears. When the second active gears rotate, the two second passive gears rotate in a direction opposite to a direction of the second active gears, and the second spring of the second passive shank scrolls toward the second active shank.

Preferably, the bottom part includes multiple posts. The bevel gear unit, the first active roller, the first passive roller, the second active roller and the second passive roller are respectively mounted to the posts.

Preferably, the planar gear, each of the first active gears, each of the first passive gears, each of the second active gears and each of the second passive gears are respectively located on respective one of multiple disks.

Preferably, one of two end caps is connected to the second end of the housing. Another one of the two end caps is connected to one of two ends of the tube and faces the first end of the housing. The two end caps guide the shade not to be tilt.

The primary object of the present invention is to provide a scrolling mechanism for a window shade, and the scrolling mechanism replaces the springs used in the conventional scrolling mechanism to simplify the assembly and manufacturing processes to reduce cost of the scrolling mechanism.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
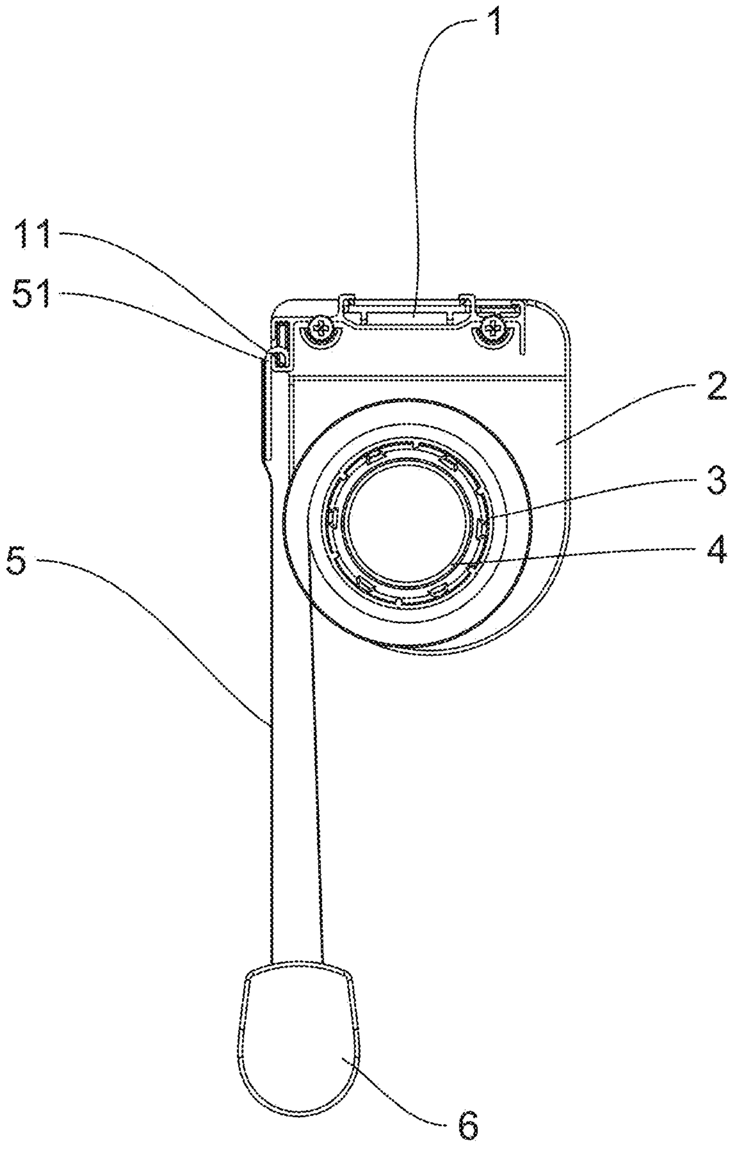
FIG. 1 is an end view to show a conventional scrolling mechanism of a window shade.
Figure 2:
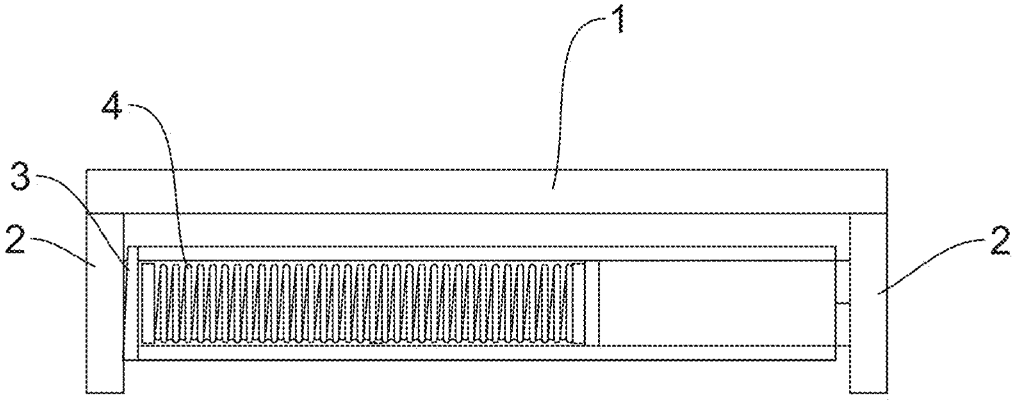
FIG. 2 is a front to illustrate the conventional scrolling mechanism of a window shade.
Figure 3:
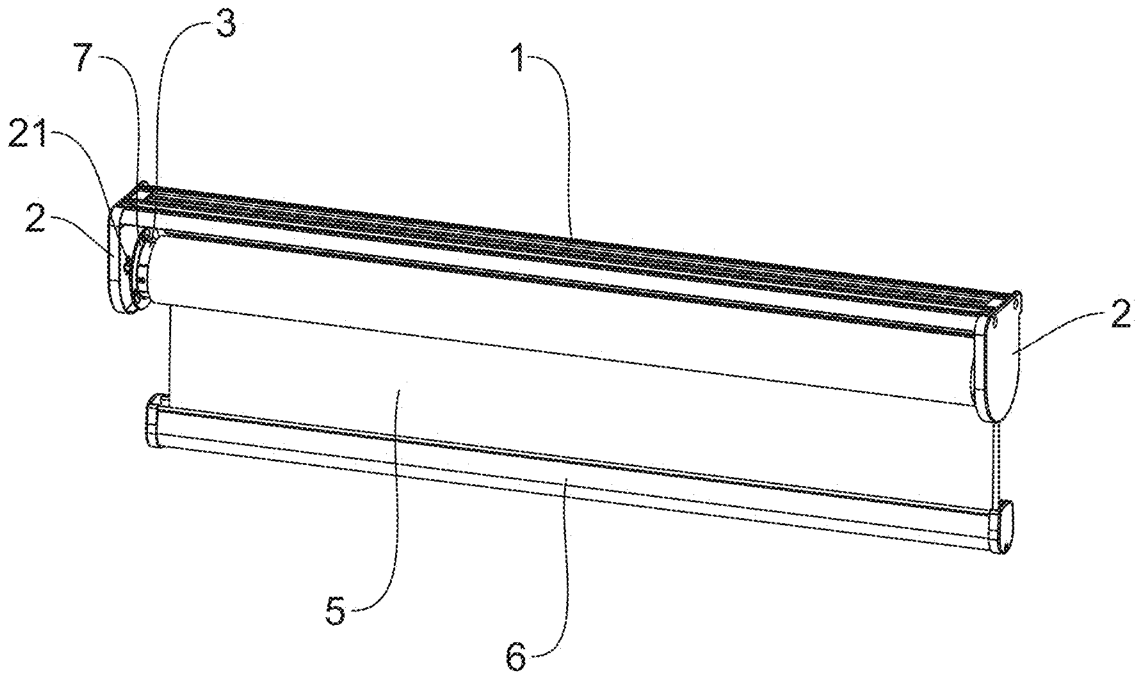
FIG. 3 is a perspective view to show the window shade with the scrolling mechanism of the present invention.
Figure 4:
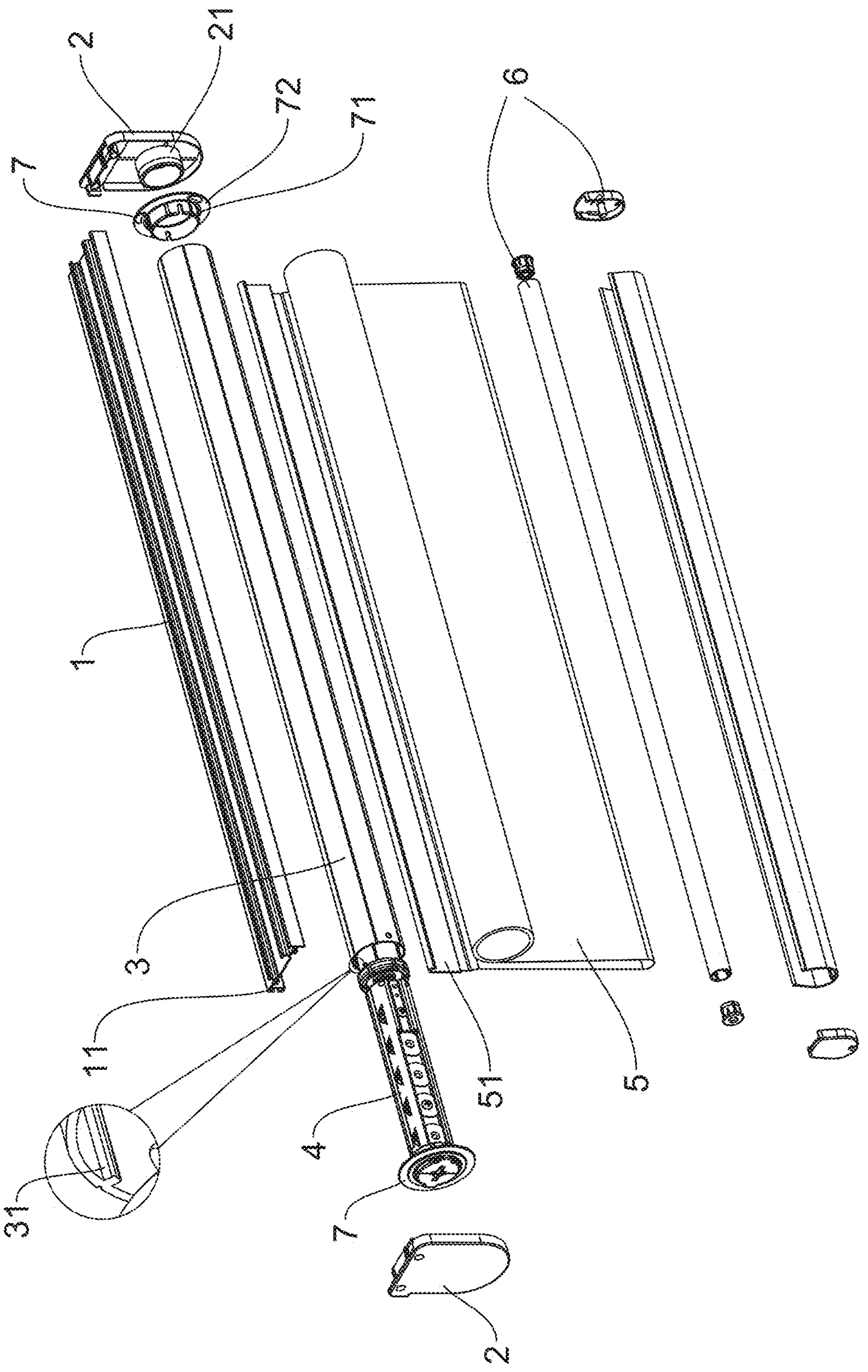
FIG. 4 shows the window shade and the scrolling mechanism of the present invention.

Referring to FIGS. 3 and 4, the window shade includes a top rail 1, and two covers 2 are connected to two ends of the top rail 1. A tube 3 is located between the two covers 3 and includes multiple ridges 31 extending axially from the inner periphery thereof. The top rail 1 includes a slit 11, and a shade 5 has an insertion 51 formed to the top end thereof, the insertion 51 is inserted into the slit 11 of the top rail 1 so as to connect the shade 5 to the top rail 1. A bottom rail 6 is connected to the lower end of the shade 5. The shade 5 is lifted and lowered along with rotation of the tube 3.

Figure 5:
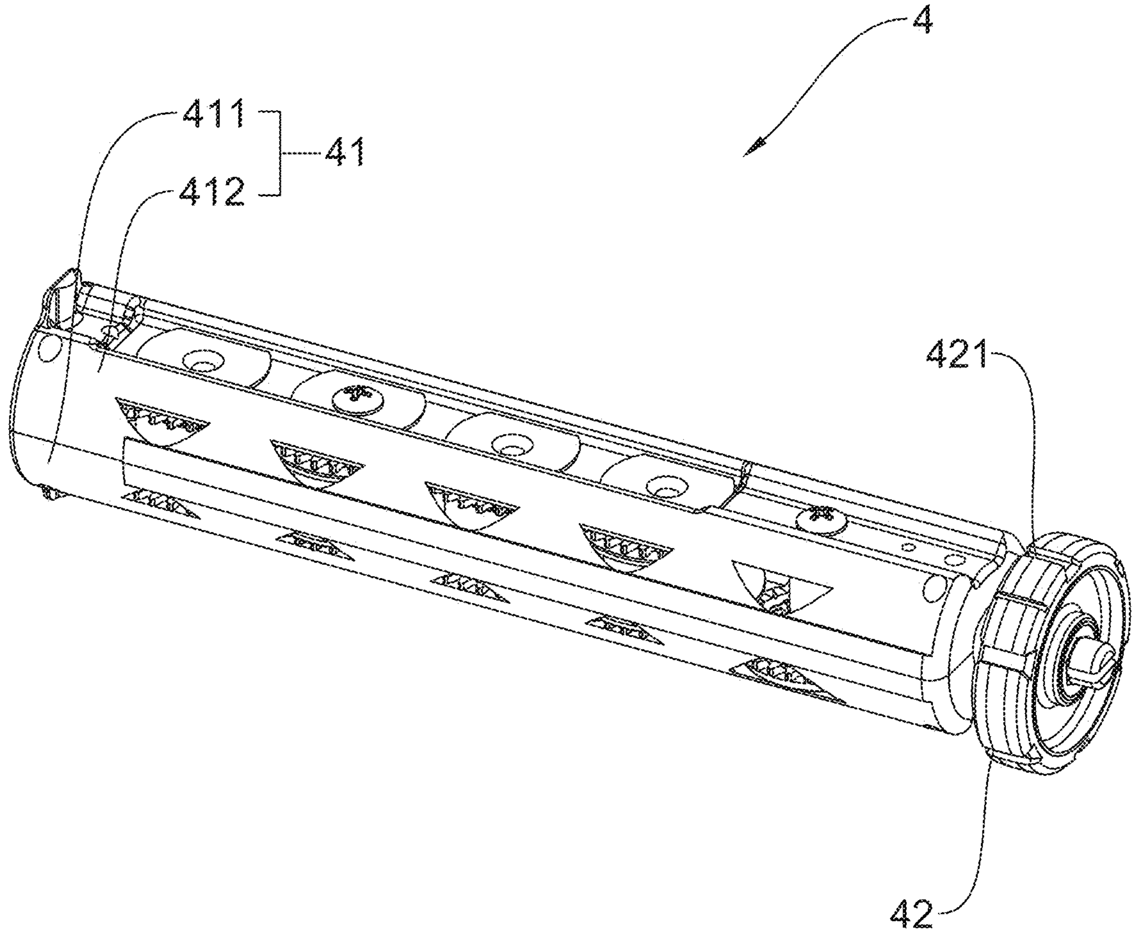
FIG. 5 is a perspective view to show the scrolling mechanism of the present invention.
Figure 6:
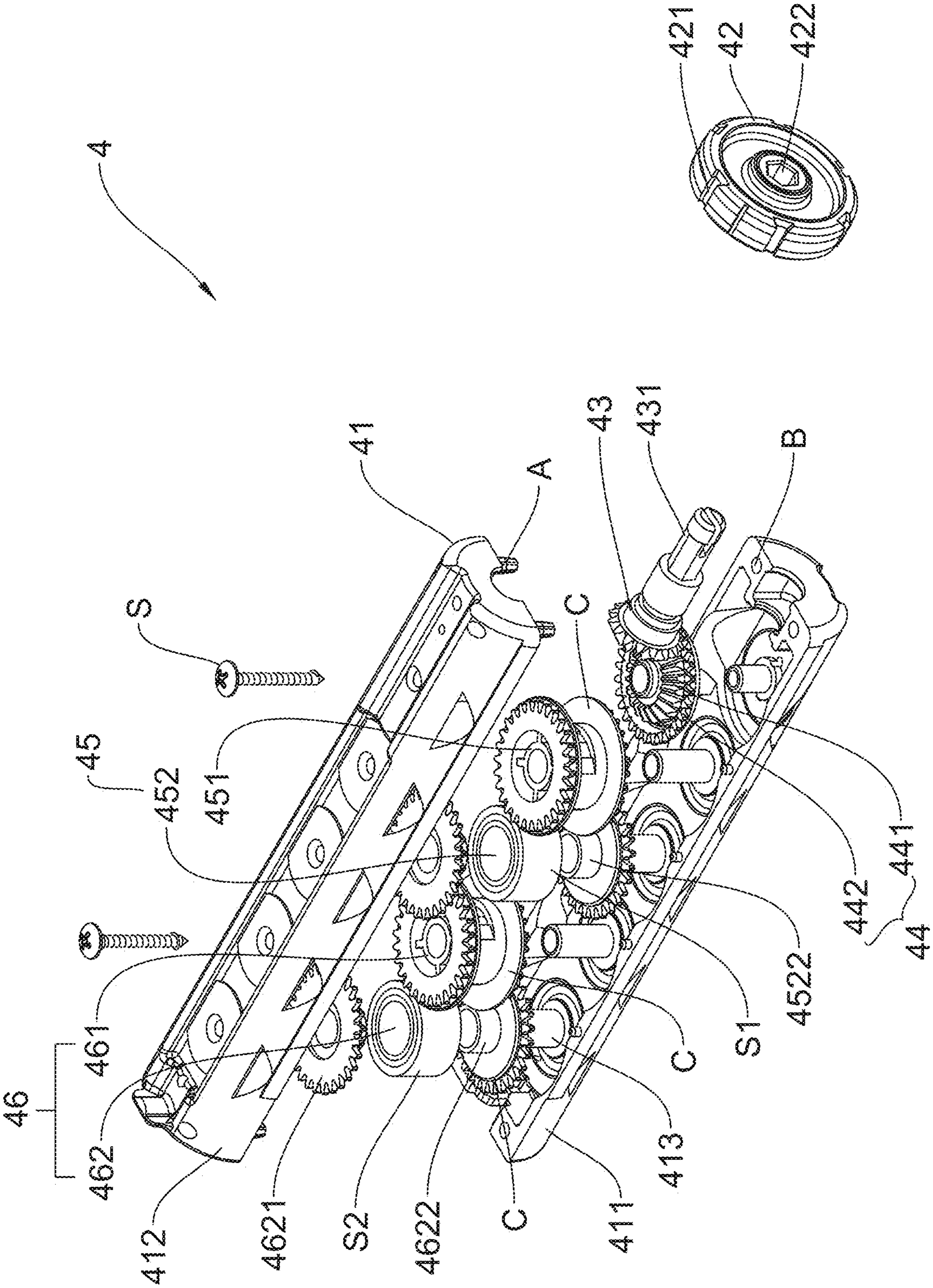
FIG. 6 is an exploded view to show the scrolling mechanism of the present invention.
Figure 7:
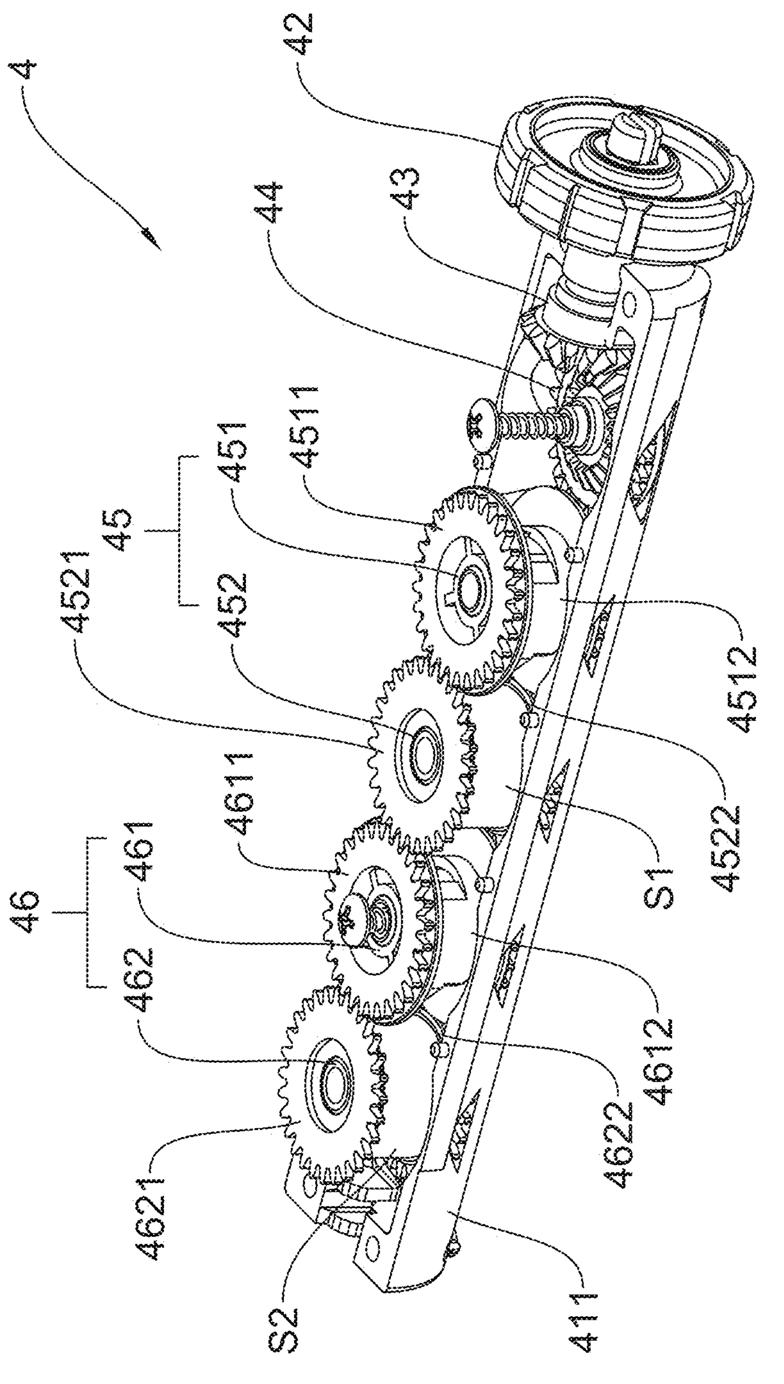
FIG. 7 is a perspective view to show the scrolling mechanism of the present invention, wherein the top part of the housing is removed.

As shown in FIGS. 5 to 7, the scrolling mechanism 4 of the present invention is received in the tube 3 and comprises a housing 41, a wheel 42, a driving gear 43, a bevel gear unit 44, a first scrolling unit 45 and a second scrolling unit 46. The housing 41 includes a bottom part 411 and a top part 412 which is connected to the bottom part 411. The housing 41 of the scrolling mechanism 4 accommodates the driving gear 43, the bevel gear unit 44, the first scrolling unit 45 and the second scrolling unit 46 therein. The rotation of the tube 3 does not contact the housing 41.

The wheel 42 is connected to the first end of the housing 41 and located in the tube 3. The wheel 42 includes grooves 421 defined axially in the outer periphery thereof, and the ridges 3 of the tube 3 are engaged with the grooves 421 so that the wheel 42 is co-rotated with the tube 3. The wheel 42 includes a central hole 422. The driving gear 43 is formed to a shaft 431 which is engaged with the central hole 422 of the wheel 42. When the wheel 42 rotates, the driving gear 43 is co-rotated with the wheel 42.

The bevel gear unit 44 includes a bevel gear 441 and a planar gear 442 which is co-axially formed with the bevel gear 441. The diameter of the planar gear 442 is larger than the diameter of the bevel gear 441 so that the bevel gear 441 is located at the center of the planar gear 442 and surrounded by the planar gear 442. The bevel gear 441 is engaged with the driving gear 43 which drives the bevel gear 441 and the planar gear 442 when the wheel 42 rotates.

As shown in FIGS. 5 to 9, the first scrolling unit 45 is engaged with the bevel gear unit 44. The first scrolling unit 45 includes a first active roller 451 and a first passive roller 452. Two first active gears 4511 are respectively connected to two ends of the first active roller 451. The first active roller 451 includes a first active shank 4512 formed to the middle portion thereof. One of the first active gears 4511 is engaged with the planar gear 442 so that the first active roller 451 is driven by the planar gear 442. Two first passive gears 4521 are respectively connected to two ends of the first passive roller 452. The first passive roller 452 includes a first passive shank 4522 formed to the middle portion thereof. A first spring "S1" has the first end thereof wrapped to the first passive shank 4522, and the second end of the first spring "S1" is wrapped to the first active shank 4512 of the first active roller 451. The two first passive gears 4521 are engaged with the first active gears 4511, and one of the first active gears 4511 is engaged with the planar gear 442. When the first active gears 4511 rotate in a first direction, the two first passive gears 4521 rotates in a direction opposite to the first direction of the first active gears 4511, such that the first spring "S1" of the first passive shank 4522 scrolls toward the first active shank 4512.

The second scrolling unit 46 is engaged with the first passive roller 452 of the first scrolling unit 45. The second scrolling unit 46 includes a second active roller 461 and a second passive roller 462. Two second active gears 4611 are respectively connected to two ends of the second active roller 461. The second active roller 461 includes a second active shank 4612 formed to the middle portion thereof. The second active gears 4611 are engaged with the first passive gears 4521 so that the second active roller 461 is driven by the first passive gears 4521. Two second passive gears 4621 are respectively connected to two ends of the second passive roller 462. The second passive roller 462 includes a second passive shank 4622 formed to the middle portion thereof.

A second spring "S2" has the first end thereof wrapped to the second passive shank 4622, and the second end of the second spring "S2 is wrapped to the second active shank 4612 of the second active roller 461. The two second passive gears 4621 are engaged with the two second active gears 4611. When the second active gears 4611 rotate, the two second passive gears 4621 rotate in a direction opposite to a direction of the second active gears 4611, and the second spring "S2" of the second passive shank 4622 scrolls toward the second active shank 4612.

Specifically, as shown in FIG. 6, the top part 412 has four protrusions "A" extending from the underside of four corners thereof, and the bottom part 411 includes four holes "B". When assembling, the protrusions "A" are inserted into the holes "B", and multiple bolts "S" extend through the top part 412 and are threadedly connected to the bottom part 411 to connected the top part 412 to the bottom part 411. The bottom part 411 includes multiple posts 413, the bevel gear unit 44, the first active roller 451, the first passive roller 452, the second active roller 461 and the second passive roller 462 are respectively mounted to the posts 413. The planar gear 442, each of the first active gears 4511, each of the first passive gears 4521, each of the second active gears 4611 and each of the second passive gears 4621 are respectively located on respective one of multiple disks "C" to ensure smooth and stable operation.

When assembling the present invention, the first spring "S1" is wrapped between the first active shank 4512 and the first passive shank 4522, and the second spring "S2" is wrapped between the second active shank 4612 and the second passive shank 4622. Then assembling the bevel gear unit 44, the first scrolling unit 45 and the second scrolling unit 46 to the correspondent posts 413 on the bottom part 411. Finally, the wheel 42 is installed to on end of the housing 41, and the whole scrolling mechanism 4 is received in the tube 3. The assembling processes are easy and can be completed in a short period of time. During the assembling processes, no spring needs to be pre-twisted as disclosed in the existed scrolling mechanism.

Figure 8:
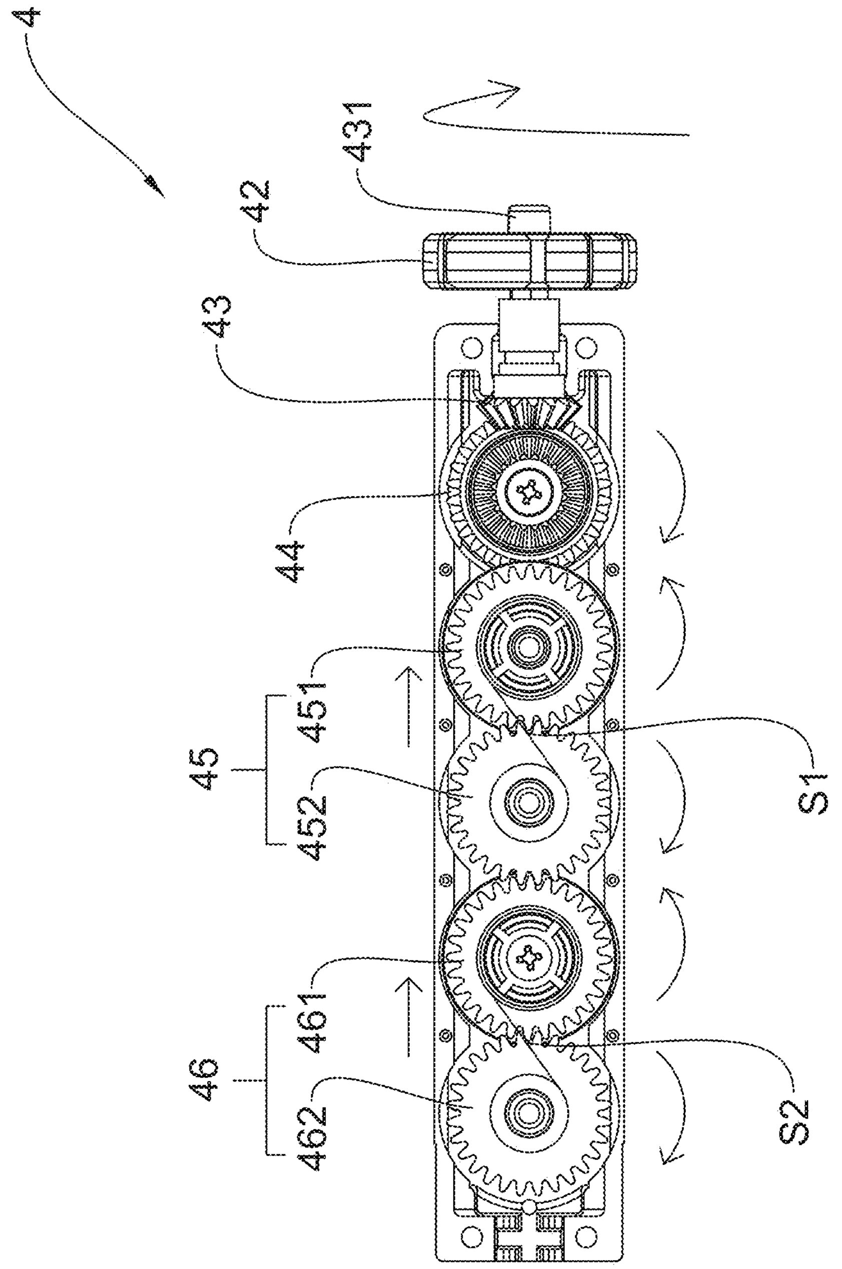
FIG. 8 shows the operation of the scrolling mechanism of the present invention, wherein the wheel rotates clockwise.

As shown in FIG. 8, when a user pulls the shade 5 downward, the tube 3 and the wheel 42 are co-rotated, and the wheel 42 rotates the shaft 431 of the driving gear 43 which drives the bevel gear unit 44. The first and second scrolling units 45, 46 are activated by the bevel gear unit 44, and the first spring "S1" is wrapped from the first passive shank 4522 toward the first active shank 4512. The second spring "S2" is wrapped from the second passive shank 4622 toward the second active shank 4612. Therefore, the first and second scrolling units 45, 46 are able to control the position of the shade 5 that moves downward.

Figure 9:
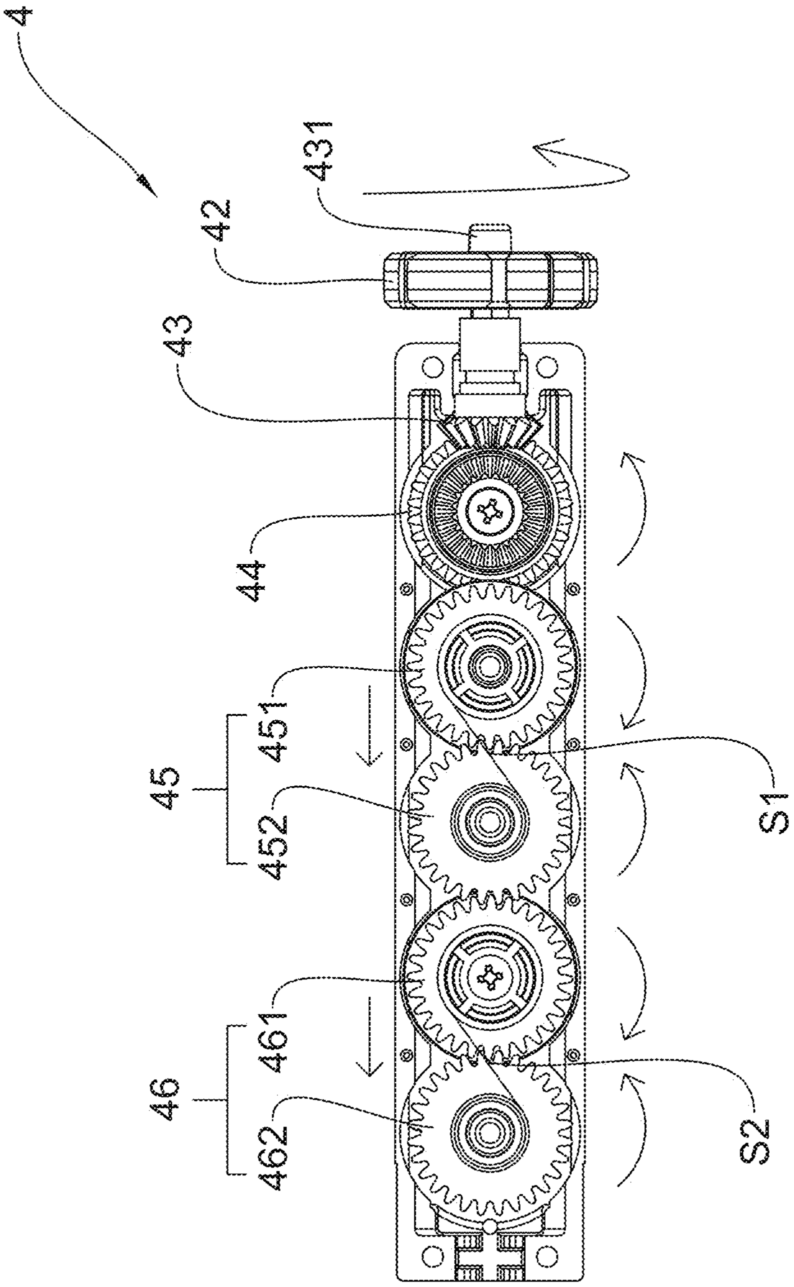
FIG. 9 shows the operation of the scrolling mechanism of the present invention, wherein the wheel rotates counter clockwise.

As shown in FIGS. 9, when a user pulls the shade 5 upward, the tube 3 and the wheel 42 are co-rotated, and the wheel 42 rotates the shaft 431 of the driving gear 43 which drives the bevel gear unit 44. The first and second scrolling units 45, 46 are activated by the bevel gear unit 44, and the first spring "S1" is wrapped from the first active shank 4512 toward the first passive shank 4522. The second spring "S2" is wrapped from the second active shank 4612 toward the second passive shank 4622. Therefore, the first and second scrolling units 45, 46 are able to control the position of the shade 5 that moves upward.

As shown in FIG. 4, one of two end caps 7 is connected to the second end of the housing 41, and another one of the two end caps 7 is connected to one of two ends of the tube 3 and faces the first end of the housing 41. The two end caps 7 are used to guide the shade 5 when the shade 5 is lifted.

While we have shown and described the embodiment in accordance with the present invention, it should be clear to those skilled in the art that further embodiments may be made without departing from the scope of the present invention.

What is claimed is:

1. A scrolling mechanism for a window shade which includes a top rail, two covers are connected to two ends of the top rail, a tube is located between the two covers and includes multiple ridges extending axially from an inner periphery thereof, the top rail includes a slit, a shade has an insertion formed to a top end thereof, the insertion is inserted into the slit of the top rail, a bottom rail is connected to a lower end of the shade, the shade is lifted and lowered along with rotation of the tube, the scrolling mechanism comprising:

a housing, a wheel, a driving gear, a bevel gear unit, a first scrolling unit and a second scrolling unit, the housing including a bottom part and a top part which is connected to the bottom part, the scrolling mechanism adapted to be located in the tube, the housing of the scrolling mechanism accommodating the driving gear, the bevel gear unit, the first scrolling unit and the second scrolling unit therein, the wheel connected to a first end of the housing and adapted to be located in the tube, the wheel including grooves defined axially in an outer periphery thereof, the grooves adapted to be engaged with ridges of the tube so that the wheel is co-rotated with the tube, the wheel including a central hole, the driving gear is formed to a shaft which is engaged with the central hole of the wheel;

the bevel gear unit including a bevel gear and a planar gear which is co-axially formed with the bevel gear, a diameter of the planar gear being larger than a diameter of the bevel gear so that the bevel gear is located at a center of the planar gear and surrounded by the planar gear, wherein the planar gear and the bevel gear are co-axially formed as a single integrated structure with the bevel gear positioned at the center of the planar gear and the planar gear extending radially outward to surround the bevel gear, the bevel gear engaged with the driving gear which drives the bevel gear and the planar gear;

the first scrolling unit engaged with the bevel gear unit, the first scrolling unit including a first active roller and a first passive roller, two first active gears respectively connected to two ends of the first active roller, the first active roller including a first active shank formed to a middle portion thereof, one of the first active gears engaged with the planar gear so that the first active roller is driven by the planar gear, two first passive gears respectively connected to two ends of the first passive roller, the first passive roller including a first passive shank formed to a middle portion thereof;

a first spring having a first end thereof wrapped to the first passive shank, a second end of the first spring wrapped to the first active shank of the first active roller, the two first passive gears engaged with the first active gears, and one of the first active gears engaged with the planar gear, when the first active gears rotate in a first direction, the two first passive gears rotates in a direction opposite to the first direction of the first active gears, and the first spring of the first passive shank scrolls toward the first active shank;

the second scrolling unit engaged with the first passive roller of the first scrolling unit, the second scrolling unit including a second active roller and a second passive roller, two second active gears respectively connected to two ends of the second active roller, the second active roller including a second active shank formed to a middle portion thereof, the second active gears engaged with the first passive gears so that the second active roller is driven by the first passive gears, wherein the first passive gears of the first scrolling unit directly engage with the second active gears of the second scrolling unit such that the second scrolling unit receives rotational force from the first scrolling unit through direct gear engagement, two second passive gears respectively connected to two ends of the second passive roller, the second passive roller including a second passive shank formed to a middle portion thereof, and a second spring having a first end thereof wrapped to the second passive shank, a second end of the second spring wrapped to the second active shank of the second active roller, the two second passive gears engaged with the two second active gears, when the second active gears rotate, the two second passive gears rotate in a direction opposite to a direction of the second active gears, and the second spring of the second passive shank scrolls toward the second active shank, wherein the bottom part includes multiple posts, wherein the bevel gear unit, the first active roller, the first passive roller, the second active roller and the second passive roller are respectively mounted to the posts, and wherein each of the respective posts is sized and positioned to maintain proper gear engagement between the planar gear and the first active gears, between the first active gears and the first passive gears, and between the first passive gears and the second active gears.

2. The scrolling mechanism for a window shade as claimed in claim 1, wherein the planar gear, each of the first active gears, each of the first passive gears, each of the second active gears and each of the second passive gears are respectively located on a respective one of multiple disks, and wherein the disks ensure smooth and stable operation of the gears.

3. The scrolling mechanism for a window shade as claimed in claim 1, wherein the top part has four protrusions extending from an underside of four corners thereof, and the bottom part includes four holes, the protrusions of the top part are inserted into the holes of the bottom part, multiple bolts extend through the top part and are threadedly connected to the bottom part to connect the top part to the bottom part, wherein the protrusions and holes provide precise alignment between the top part and bottom part to maintain proper positioning of the internal components.

4. The scrolling mechanism for a window shade as claimed in claim 1, further comprising two end caps, wherein one of the two end caps is connected to a second end of the housing, another one of the two end caps is adapted to be connected to one of two ends of the tube and faces the first end of the housing, the two end caps are configured to guide the shade when the shade is lifted and prevent lateral movement and tilting during operation.

5. The scrolling mechanism for a window shade as claimed in claim 1, wherein the co-axially formed bevel gear unit simplifies assembly and manufacturing processes compared to multi-component bevel gear systems, and wherein the direct engagement between the first passive gears and second active gears provides improved torque transmission characteristics.

6. The scrolling mechanism for a window shade as claimed in claim 1, wherein the co-axially formed structure of the bevel gear and planar gear reduces manufacturing complexity compared to separately formed and assembled gear components.

* * * * *